(12) United States Patent
Lin et al.

(10) Patent No.:     US 12,659,906 B2
(45) Date of Patent:     Jun. 16, 2026

(54) NON-ACCESS STRATUS (NAS) SIGNALING CONNECTION HANDLING FOR PUBLIC LAND MOBILE NETWORK (PLMN) SELECTION

(71) Applicant: MEDIATEK INC., Hsin-Chu (TW)

(72) Inventors: Yu-Hsin Lin, Hsin-Chu (TW); Yuan-Chieh Lin, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 451 days.

(21) Appl. No.: 18/137,308

(22) Filed: Apr. 20, 2023

(65) Prior Publication Data

US 2023/0362866 A1     Nov. 9, 2023

Related U.S. Application Data

(60) Provisional application No. 63/338,496, filed on May 5, 2022.

(51) Int. Cl.
H04W 60/06     (2009.01)

(52) U.S. Cl.
CPC ................................... H04W 60/06 (2013.01)

(58) Field of Classification Search
None
See application file for complete search history.

(56) References Cited

U.S. PATENT DOCUMENTS

2019/0349849 A1*  11/2019  Kavuri et al. ........ H04W 60/06
2022/0264695 A1*   8/2022  Watfa .................... H04W 16/08
2025/0097873 A1*   3/2025  Sugawara ............. H04W 60/06
2025/0159642 A1*   5/2025  Hashmi ................. H04W 60/06

OTHER PUBLICATIONS

3rd Generation Partnership Project; Technical Specification Group Core Network and Terminals; Non-Access-Stratum (NAS) protocol for 5G System (5GS); Stage 3; (Release 17), 3GPP TS 24.501 V17.6.1 (Mar. 2022) (Year: 2022).*
European Intellectual Property Office Action, dated Aug. 30, 2023 (20 pages).
Huawei et al: "Starting timer T3440 with cause value #42", 3GPP Draft; CP-220264,3$^{rd}$ Generation Partnership PROJECT(3GPP), Mobile Competence Centre; 650 Route Des Lucioles; F-06921 Sophia-Antipolis Cedex; France, vol. CT WG1, No. E-Meeting; Feb. 17, 2022-Feb. 25, 2022 Mar. 3, 2022, XP052129129.

(Continued)

*Primary Examiner* — Rafael Pérez-Gutiérrez
(74) *Attorney, Agent, or Firm* — Helen Mao; Zheng Jin; Imperium Patent Works

(57)     ABSTRACT

A method of NAS signaling connection handling when a UE initiates a de-registration or detach procedure to perform network selection is proposed. To allow the UE to perform PLMN selection, the UE needs to be in idle mode. Upon the completion of a UE-initiated de-registration or detach procedure, the UE starts a guard timer, e.g., T3540/T3440. In one example, the UE starts a guard timer upon receiving a de-registration accept message. In another example, the UE starts a guard timer upon receiving a detach accept message. The UE will locally release any NAS signaling connection upon the guard timer expiry so that the UE can enter idle mode and perform PLMN selection.

12 Claims, 4 Drawing Sheets

(56)  References Cited

OTHER PUBLICATIONS

Mediatec Inc: "Correction of T3440 start scenarios for TAU procedure", 3GPP Draft; C1-220646, 3$^{rd}$ Generation Partnership Project (3GP), Mobile Competence Centre; 650 Route Des Lucioles; F-06921 Sophia-Antipolis Cedex; France, vol. CT WG1, No. E-meeting; Jan. 17, 2022-Jan. 21, 2022 Jan. 20, 2022, XP052101544.

3GPP.TSG-CT WG1 Meeting #128-e, C1-211248, Electronic meeting. Feb. 25-Mar. 5, 2021.

Huawei, HiSilicon.Starting timer T3440 with cause value #42.3GPP TSG-CT WG1.Feb. 17-25, 2022.C1-221914 Section 5.3.1.2.1.

Mediatek Inc.Correction of T3440 start scenarios for TAU procedure. 3GPP TSG-CT WG1.Jan. 17-21, 2022.C1-220646 Section 5.3.1.2. 1.

3GPP TSG-CT WG1 Meeting #128-e, C1-211248, Electronic meeting Feb. 25-Mar. 5, 2021 p. 3, from bottom line 4~7-p. 4, line 25~28.

* cited by examiner

130

- INITIATE A DETACH/ DEREGISTRATION PROCEDURE
- START A GUARD TIMER
- RELEASES THE NAS SIGNALING CONNECTION WHEN GUARD TIMER EXPIRES

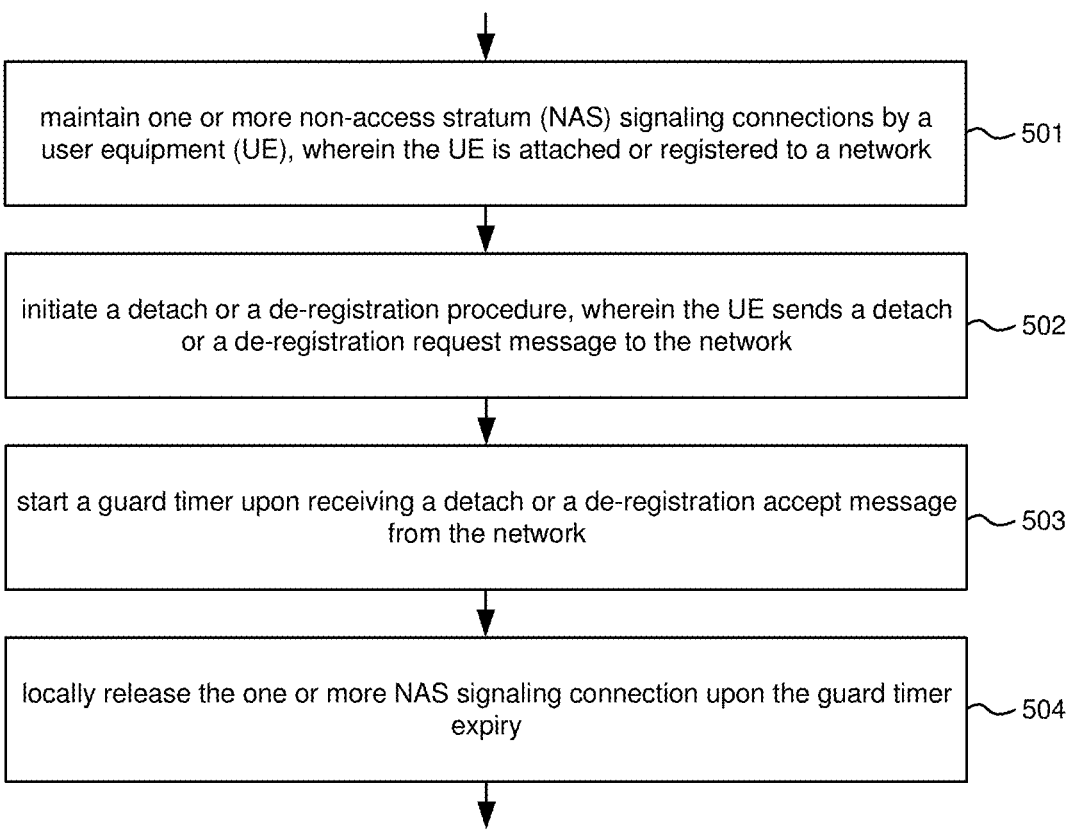

maintain one or more non-access stratum (NAS) signaling connections by a user equipment (UE), wherein the UE is attached or registered to a network ⌇ 501 initiate a detach or a de-registration procedure, wherein the UE sends a detach or a de-registration request message to the network ⌇ 502 start a guard timer upon receiving a detach or a de-registration accept message from the network ⌇ 503 locally release the one or more NAS signaling connection upon the guard timer expiry ⌇ 504

FIG. 5

NON-ACCESS STRATUS (NAS) SIGNALING CONNECTION HANDLING FOR PUBLIC LAND MOBILE NETWORK (PLMN) SELECTION

CROSS REFERENCE TO RELATED APPLICATIONS

This application claims priority under 35 U.S.C. § 119 from U.S. Provisional Application No. 63/338,496, entitled "NAS Signaling Connection Handling for PLMN Selection or non-switch-off detach/de-registration", filed on May 5, 2022, the subject matter of which is incorporated herein by reference.

TECHNICAL FIELD

The disclosed embodiments relate generally to wireless mobile communication network, and, more particularly, to methods for NAS signaling connection handling when UE initiates a de-registration or detach procedure to perform network selection.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated Internet Protocol (IP) network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE, i.e., MS), terminal equipment (TE), mobile stations (MS, i.e., UE), mobile termination (MT), etc. Examples of different RATs include 2G GERAN (GSM) radio access network, 3G UTRAN (UMTS) radio access network, 4G E-UTRAN (LTE), 5G new radio (NR) radio access network, NG-RAN (Next-Generation RAN), and other non-3GPP access RAT including WiFi.

For a selected PLMN in 5GS, a Registration Request message is used by a UE to initiate a registration process with the 5G core network. The serving base station (gNB) in the selected PLMN transports the Registration Request from the UE to an access and mobility management function (AMF). The gNB carries the NAS signaling between the UE and the AMF. The UE then enters connected state after the registration is completed. A network (PLMN) selection process is a mechanism used for UE mobility in idle and inactive states. To allow the UE to perform PLMN selection, the UE needs to be in idle mode. In most scenarios, the network entity (the AMF) should release the NAS signaling connection so that the UE can enter idle mode for performing PLMN selection. A guard timer can be started by the UE to allow the network to release the NAS signaling connection. If the network did release the connection before the timer expiry, the timer will be stopped. If the network didn't release the connection before the timer expiry, the UE will locally release the connection upon guard timer expiry.

In some other scenarios, if the network does not release the connection and the guard timer was not started after the UE enter state 5GMM/EMM-DEREGISTERED.PLMN-SEARCH or 5GMM/EMM-REGISTERED.PLMN-SEARCH, then the UE will not be able to perform PLMN selection. Further, in traditional design, the UE does not start the guard timer when a UE-initiated non-switch-off de-registration or detach procedure is complete. As a result, if the network does not release the connection, then the UE will not be able to perform PLMN selection.

A solution is sought.

SUMMARY

A method of NAS signaling connection handling when a UE initiates a de-registration or detach procedure to perform network selection is proposed. To allow the UE to perform PLMN selection, the UE needs to be in idle mode. Upon the completion of a UE-initiated de-registration or detach procedure, the UE starts a guard timer, e.g., T3540/T3440. In one example, the UE starts a guard timer upon receiving a de-registration accept message. In another example, the UE starts a guard timer upon receiving a detach accept message. The UE will locally release any NAS signaling connection upon the guard timer expiry so that the UE can enter idle mode and perform PLMN selection.

In one embodiment, a UE maintains one or more non-access stratum (NAS) signaling connections, wherein the UE is attached or registered to a network. The UE initiates a detach or a de-registration procedure, wherein the UE sends a detach or a de-registration request message to the network. The UE starts a guard timer upon receiving a detach or a de-registration accept message from the network. The UE locally releases the one or more NAS signaling connection upon the guard timer expiry, wherein the UE does not receive a NAS signaling release command message from the network before the guard timer expiry. In one embodiment, the network is a 5G network, and wherein the UE starts the guard timer in response to the de-registration accept message. In another embodiment, the network is a 4G network, and wherein the UE starts the guard timer in response to the detach accept message. In one embodiment, the guard timer is T3540 or T3440, and the detach or the de-registration procedure is a non-switch-off detach or de-registration procedure.

Other embodiments and advantages are described in the detailed description below. This summary does not purport to define the invention. The invention is defined by the claims.

BRIEF DESCRIPTION OF THE DRAWINGS

FIG. 5 is a flow chart of a method of NAS signaling connection handling when UE initiates a de-registration or detach procedure to perform network selection in accordance with one novel aspect.

DETAILED DESCRIPTION

Reference will now be made in detail to some embodiments of the invention, examples of which are illustrated in the accompanying drawings.

Figure 1:
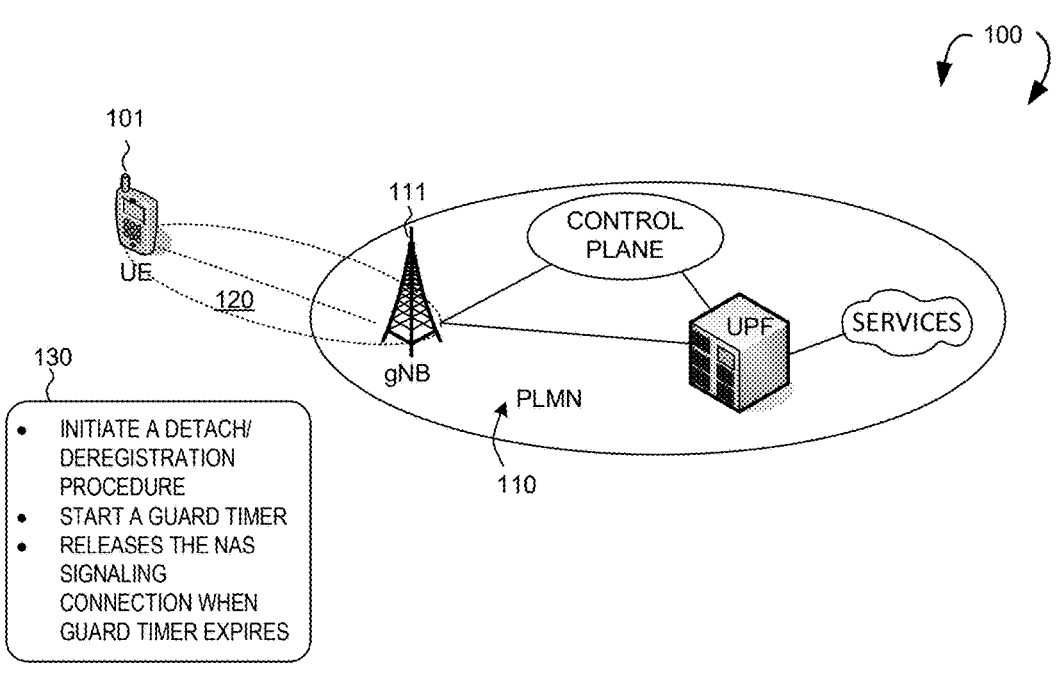
FIG. 1 schematically shows a communication system having a Public Land Mobile Network (PLMN) and a User Equipment (UE) for network selection in idle mode in accordance with one novel aspect.

FIG. 1 schematically shows a communication system having a Public Land Mobile Network (PLMN) and a User Equipment (UE) for network selection in idle mode in accordance with one novel aspect. PLMN network 110 comprises control plane functionalities, user plane functionality (e.g., UPF), and applications that provides various services by communicating with a plurality of user equipments (UEs) including UE 101. Serving base station gNB 111 belong to part of a radio access network RAN 120. RAN 120 provides radio access for UE 101 via a radio access technology (RAT). An access and mobility management function (AMF) in PLMN 110 communicates with gNB 111. UE 101 may be equipped with a radio frequency (RF) transceiver or multiple RF transceivers.

For the selected PLMN 110 in 5GS, a Registration Request message is used by UE 101 to initiate a registration process with the 5G core network. The serving base station gNB 111 in the selected PLMN 110 transports the Registration Request from UE 101 to an access and mobility management function (AMF). The gNB carries the NAS signaling between the UE and the AMF. The UE then enters connected state after the registration is completed. A network (PLMN) selection process is a mechanism used for UE mobility in idle and inactive states. In order to allow the UE to perform PLMN selection, the UE needs to be in idle mode.

In most scenarios, the network entity (the AMF) should release the NAS signaling connection so that the UE can enter idle mode for performing PLMN selection. A guard timer can be started by the UE to allow the network to release the NAS signaling connection. If the network did release the connection before the timer expiry, the timer will be stopped. If the network didn't release the connection before the timer expiry, the UE will locally release the connection upon guard timer expiry. In some other scenarios, if the network does not release the connection and the guard timer was not started after the UE enter state 5GMM/EMM-DEREGISTERED.PLMN-SEARCH or 5GMM/EMM-REGISTERED.PLMN-SEARCH, then the UE will not be able to perform PLMN selectin. Further, in traditional design, the UE does not start the guard timer when a UE-initiated non-switch-off de-registration or detach procedure is complete. As a result, if the network does not release the connection, then the UE will not be able to perform PLMN selection.

In accordance with one novel aspect, a method of NAS signaling connection handling when a UE initiates a de-registration or detach procedure to perform network selection is proposed, as depicted by 130. To allow the UE to perform PLMN selection, the UE needs to be in idle mode. Upon the completion of the UE-initiated de-registration or detach procedure, the UE starts a guard timer, e.g., T3540/T3440. In one example, the UE starts a guard timer upon receiving a de-registration accept message. In another example, the UE starts a guard timer upon receiving a detach accept message. The UE will locally release any NAS signaling connection upon the guard timer expiry so that the UE can enter idle mode and perform PLMN selection.

Figure 2:
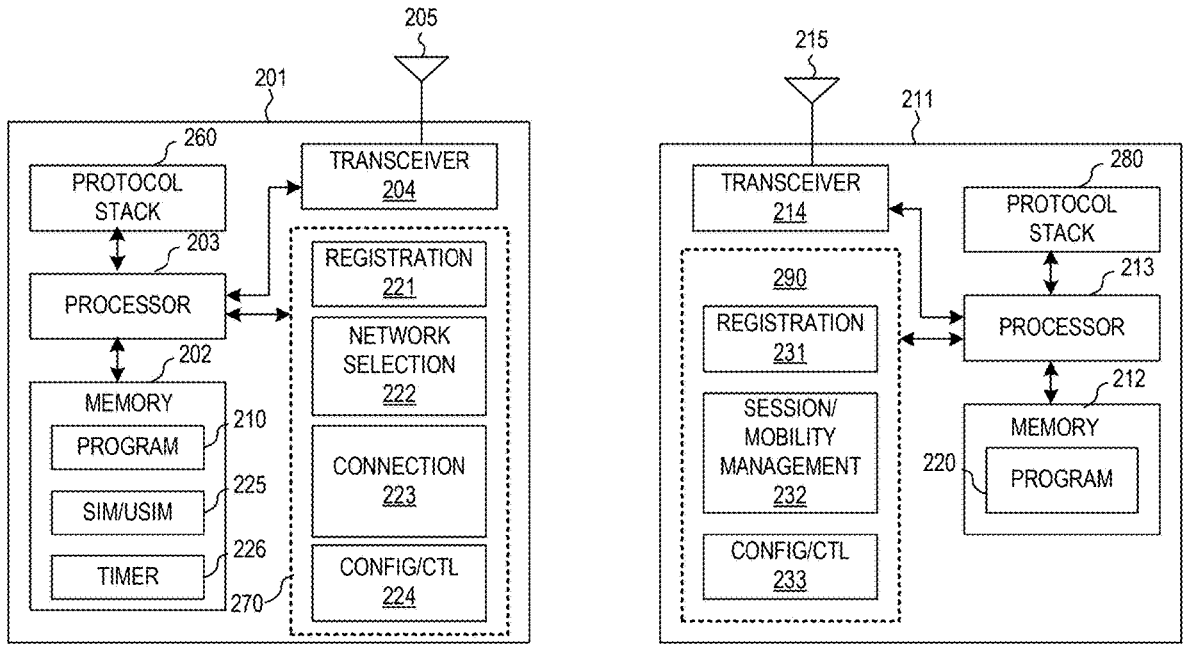
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session and mobility management circuit 232 handles session management and mobility management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network.

In one example, system modules and circuits 270 comprise registration circuit 221 that performs registration and mobility procedure with the network, a network selection circuit 222 for performing network selection, a connection handling circuit 223 that handles the adding, removing, and resetting of one or more NAS signaling connections and higher layer connections, a config and control circuit 224 that handles configuration and control parameters. Note that the network selection and registration related information, such as HPLMN, Operator Controlled PLMN Selector list, User Controlled PLMN Selector list, may be stored in SIM/USIM 225 and/or in UE (non-volatile) memory. Timer 226 is used to facilitate the UE to handle the signaling connections, e.g., to locally release the NAS signaling connections upon the timer expiry.

Figure 3:
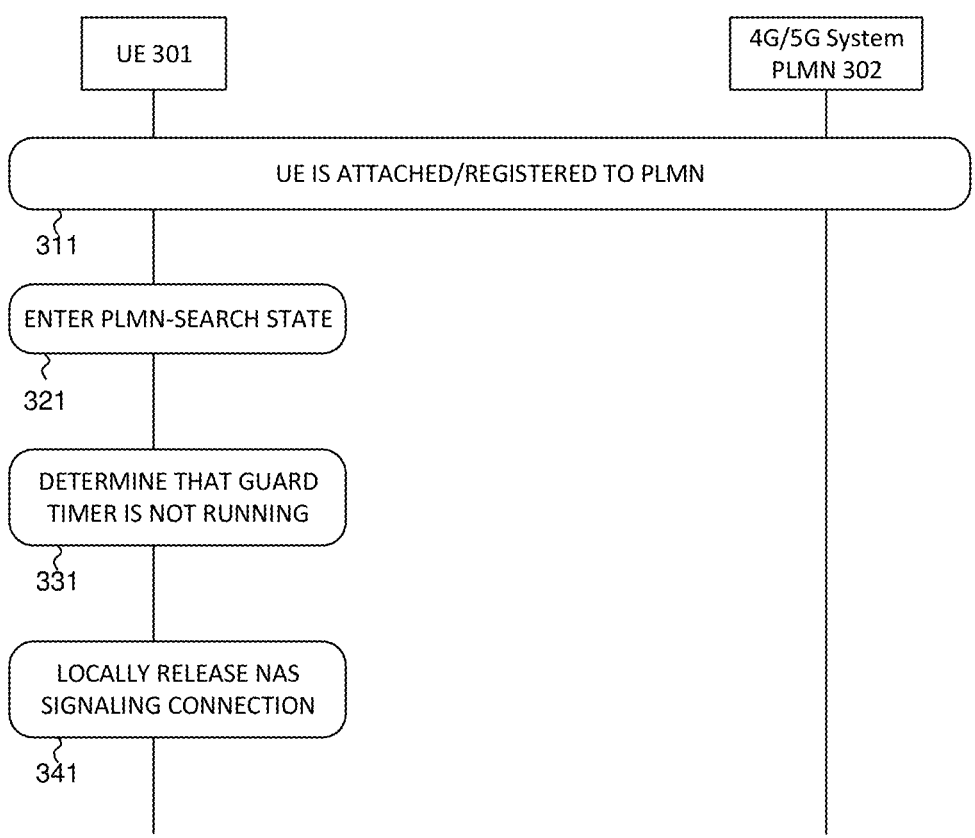
FIG. 3 illustrates a first embodiment of UE entering PLMN-SEARCH state for performing PLMN selection while no guard timer is running.

FIG. 3 illustrates a first embodiment of UE entering PLMN-SEARCH state for performing PLMN selection while no guard timer is running. In step 311, UE 301 is attached (in EPS) or registered (in 5GS) in PLMN 302. UE 301 establishes NAS signaling connections with the network entity (MME/AMF) and enters connected state after attachment or registration. Later on, in step 321, UE 301 wishes to enter PLMN-SEARCH state, in order to perform PLMN selection. In step 331, UE 301 determines that a guard timer is not running. In step 341, UE 301 locally releases the NAS signaling connections, in order to enter idle state and perform PLMN search. In one example (in 5GS), if the timer T3540 is not running when the UE enters state 5GMM-DEREGISTERED.PLMN-SEARCH or 5GMM-REGISTERED.PLMN-SEARCH, the UE may locally release the N1 NAS signaling connection. In another example (EPS), if the timer T3440 is not running when the UE enters state EMM-DEREGISTERED.PLMN-SEARCH or EMM-REGISTERED.PLMN-SEARCH, the UE may locally release the NAS signaling connection. If the UE want to register or attach to the same PLMN, then the UE can reuse the existing connection to register/attach the same PLMN.

Figure 4:
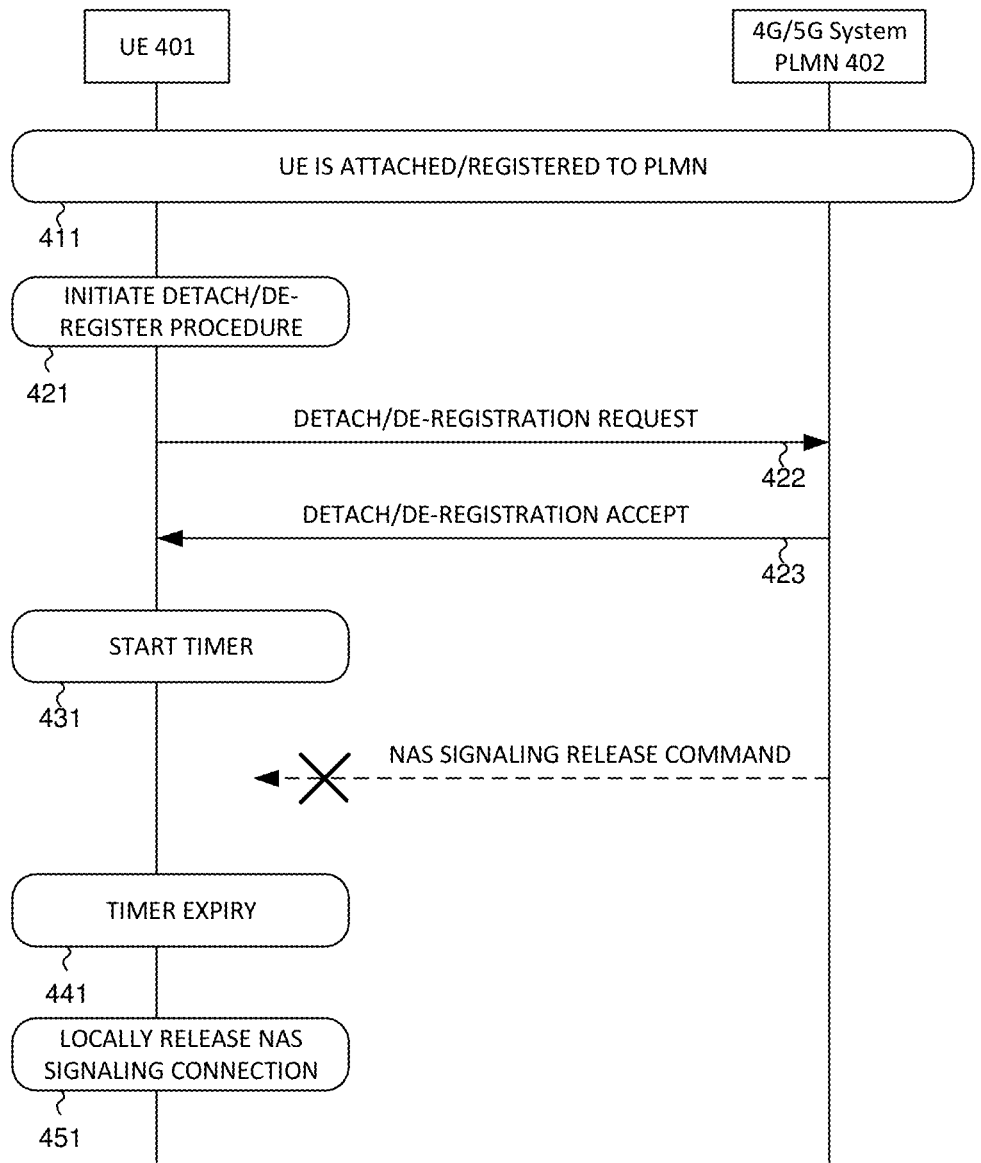
FIG. 4 illustrates a second embodiment of UE initiating a detach/de-registration procedure and starting a guard timer for performing PLMN selection.

FIG. 4 illustrates a second embodiment of UE initiating a detach/de-registration procedure and starting a guard timer for performing PLMN selection. In step 411, UE 401 is attached (in EPS) or registered (in 5GS) in PLMN 402. UE 401 establishes NAS signaling connections with the network entity (MME/AMF) and enters connected state after attached or registered. Later on, in step 421, UE 401 initiates a non-switch-off detach or de-registration procedure. In step 422, UE 401 sends a DETACH REQUEST or a DEREGISTRATION REQUEST message to the network. In response, in step 423, UE 401 receives a detach or de-registration accept message from the network, which completes the UE-initiated detach or de-registration procedure.

As a result, in step 431, UE 401 starts a guard timer, e.g., starts timer T3540 if the UE receives a DEREGISTRATION ACCEPT message in 5GS, and starts timer T3440 if the UE receives a DETACH ACCEPT message and the UE has set the detach type to "EPS detach" or "combined EPS/IMSI detach" in the DETACH REQUEST message. After sending the DETACH ACCEPT or the DEREGISTRATION ACCEPT message, the network is supposed to release the NAS signaling connection for the UE by sending a NAS SIGNALING RELEASE COMMAND message to UE 401. However, the network may not send such message on time, or such message may be lost during transportation. In step 441, the guard timer expires, and UE 401 determines that the NAS signaling connections are not released by an indication from lower layers. For example, UE 401 has not received the RRCRelease message or the RRCConnectionRelease message from the network. In step 451, UE 401 locally releases the NAS signaling connection upon timer expiry, so that the UE can enter idle state and perform PLMN selection.

FIG. 5 is a flow chart of a method of NAS signaling connection handling when UE initiates a de-registration or detach procedure to perform network selection in accordance with one novel aspect. In step 501, a UE maintains one or more non-access stratum (NAS) signaling connections, wherein the UE is attached or registered to a network.

In step 502, the UE initiates a detach or a de-registration procedure, wherein the UE sends a detach or a de-registration request message to the network. In step 503, the UE starts a guard timer upon receiving a detach or a de-registration accept message from the network. In step 504, the UE locally releases the one or more NAS signaling connection upon the guard timer expiry. The UE determined that the NAS signaling connections are not released by an indication from lower layers.

In one embodiment, the network is a 5G network, and wherein the UE starts the guard timer in response to the de-registration accept message. In another embodiment, the network is a 4G network, and wherein the UE starts the guard timer in response to the detach accept message. In one embodiment, the guard timer is T3540 or T3440, and the detach or the de-registration procedure is a non-switch-off detach or de-registration procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   maintaining one or more non-access stratum (NAS) signaling connections by a user equipment (UE), wherein the UE is attached or registered to a network;
   initiating a de-registration procedure, wherein the UE sends a de-registration request message to the network;
   starting a guard timer upon receiving or a de-registration accept message from the network; and
   locally releasing the one or more NAS signaling connections upon the guard timer expiry.

2. The method of claim 1, wherein the network is a 5G network, and wherein the UE starts the guard timer in response to the de-registration accept message.

3. The method of claim 1, wherein the guard timer is T3540 or T3440.

4. The method of claim 1, wherein or the de-registration procedure is a non-switch-off de-registration procedure.

5. The method of claim 1, further comprising:
   entering an idle mode and perform network selection upon releasing the one or more NAS signaling connections.

6. The method of claim 1, wherein the NAS signaling connections are not released before the guard timer expiry and the UE determined that the NAS signaling connections are not released by an indication from lower layers.

7. A User Equipment (UE), comprising:
   circuitry configured to:
   maintain one or more non-access stratum (NAS) signaling connections, wherein the UE is registered to a network;
   initiate a de-registration procedure, wherein the UE sends a detach or a de-registration request message to the network;
   start a guard timer upon receiving a de-registration accept message from the network; and
   locally release the one or more NAS signaling connections upon the guard timer expiry.

8. The UE of claim 7, wherein the network is a 5G network, and wherein the UE starts the guard timer in response to the de-registration accept message.

9. The UE of claim 7, wherein the guard timer is T3540 or T3440.

10. The UE of claim 7, wherein the de-registration procedure is a non-switch-off de-registration procedure.

11. The UE of claim 7, wherein the circuitry is configured to further:

perform network selection upon entering an idle mode and releasing the one or more NAS signaling connections.

12. The UE of claim 7, wherein the NAS signaling connections are not released before the guard timer expiry and the UE determined that the NAS signaling connections are not released by an indication from lower layers.

\* \* \* \* \*